June 29, 1965 R. M. GOODMAN 3,192,387
ELECTRO-OPTICAL DEVICE FOR PRODUCING A MODULATED VOLTAGE
Filed March 22, 1961

INVENTOR.
ROBERT M. GOODMAN
BY
Nelson E. Kimmelman
ATTORNEY

United States Patent Office 3,192,387
Patented June 29, 1965

3,192,387
ELECTRO-OPTICAL DEVICE FOR PRODUCING A MODULATED VOLTAGE
Robert M. Goodman, 7811 Mill Road, Elkins Park, Pa.
Filed Mar. 22, 1961, Ser. No. 97,659
6 Claims. (Cl. 250—217)

This invention relates to a novel electro-optical device and in particular to such a device useful as a switch, relay, or amplifier.

Devices are known in which a photosensitive device such as a photoconductive cell is placed near a light source within a light-tight enclosure. The light source has consisted of a gas discharge light source such as a neon tube which is energized by an input signal. The photoconductive device is connected to an external circuit and its resistance varies as a function of the incident light from the light source. These prior art devices were useful as relays, commutators, resistance-varying devices, and light choppers. They were characterized by relatively good isolation of the input from the output, absence of moving parts, low insertion losses, very little tendency to be microphonic, and relatively long life.

While these prior art devices were useful, their utility was limited by the fact that they were relatively large and heavy for certain miniature applications. Also, if incandescent lamps were used, they required relatively high power to energize them. When a gas discharge light source was used, the input signal voltage applied to energize the light source had to be relatively high, i.e., power sources appropriate for vacuum tubes or high-voltage transistor circuits were required.

It is therefore an object of the present invention to provide an improved electro-optical device of the type described which is smaller than ones previously available;

Another object of the present invention is to provide an improved electro-optical device of the type described which is lighter than types hitherto known;

A further object of the invention is to provide an improved electro-optical device of the type described which requires lower input signal levels for producing appreciable resistance drops in the photosensitive device than has hitherto been possible;

Still another object of the invention is to provide a device of the type described which can be incorporated in lower power circuits than has previously been possible;

Other objects of the invention will be apparent to those skilled in the art upon perusal of the drawings, specification and claims herein.

In accordance with my invention, I provide within a light-tight enclosure, a photo-conductive cell having a sensitive active area near which at least one light source such as an incandescent light is placed. On the other side of the light source I provide a means for reflecting the light from the source primarily onto the active area. The enclosure is provided with apertures for permitting potentials to be applied to the light source and to the photo-conductive cell respectively by means of leads. The use of the reflector has been found to reduce the input power requirement considerably, in some cases, for example, by almost one-third. In another form of my invention I provide several light sources to which different voltages may be applied for modulation or "chopping," for example.

Figure 1:
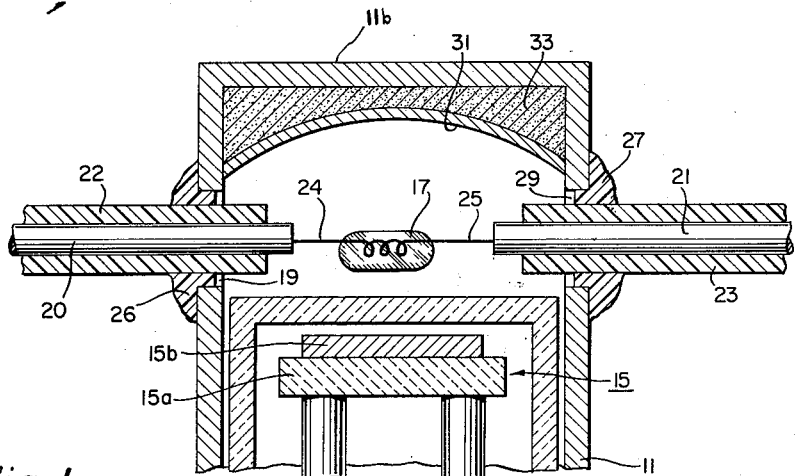
FIGURE 1 is a longitudinal sectional view of a device embodying my invention.

Referring to FIGURE 1, there is shown enclosed within a tubular enclosure 11 a photo-conductive cell 13 which is coaxial with the enclosure 11. The cell has a glass wall 14 and a glass sealing bead 16 through which leads 18a and 18b pass. The cell 13 has an active area 15 comprising a ceramic substrate 15a and a deposited pattern 15b of a photo-conductive material such as CdSe. As an example of this type of cell reference is made to the hermetically-sealed photo-conductive cell, type CL604L sold by the Clairex Corporation of New York.

Close to the active area 15 I provide a miniature light source 17 such as the sub-miniature incandescent, "Pin-lite" brand bulb manufactured by Kay Electric Company. Leads 24 and 25 of the source 17 are attached to conductors 20 and 21 respectively which pass through insulating sleeves 22 and 23 that are disposed in coaxial apertures 19 and 29 in the tubular member 11. Gobs 26 and 27 of a sealant such as "Apiezon W" a hard black wax distributed by James G. Biddle Company of Philadelphia, Pennsylvania, are disposed in contact with the sleeves 22 and 23 as shown to keep the interior free from ambient light. The same wax material or other equivalent insulating and opaque sealant may be used to form a seal 28 at the open end of the member 11 through which the leads 18a and 18b pass. To provide electrical shielding, the enclosure 11 may be made of a metal such as brass.

In accordance with my invention I have found that the input signal power requirement may be reduced by close to one-third if means are provided for directing most of the light from the source 17 onto the active area 15. I have found that the best way this can be accomplished is by providing a reflector 31 on the side of the light source close to the end 11b of enclosure 11. The reflector 31 is preferably curved to have a parabolic shape or the shape of a spherical surface. If the reflector 31 is relatively thin a backing member 33 may be provided for structural rigidity. The member 33 may be made of a plastic substance or made of plaster, to cite several illustrative materials. Of course, if the reflector 31 is less fragile and more rigid the backing member may be dispensed with and the reflector 31 may be attached directly to the inner flat end surface of the member 11b.

As indicative of the dimensions of such a device, I have constructed them with a length of about ¾" and a diameter of ³⁄₁₀".

With this device, I have been able to reduce by close to one-third the power input requirement for the light source to produce a given resistance across the photoconductive cell. In the short table following I have summarized the substantial difference that the reflector 31 makes as compared with an essentially similar cell not having the reflector. It will be observed that the input power requirements are exceedingly small, i.e., 10.7 milliwatts–14.5 milliwatts for a range of photoconductive cell resistances from 200 ohms to 110 ohms. By comparison with input power required for the substantially identical device without the reflector it will be seen that the use of the reflector resulted in considerable percentage savings ranging from 30.9 to 32.8 with respect to the same range of photoconductive cell resistances.

Table

| Cell Resist. | With Reflector, milliwatts | Without Reflector, milliwatts | Δ mw. | Percent Difference |
|---|---|---|---|---|
| 200 ohms | 10.7 | 14.0 | 3.3 | 30.9 |
| 140 ohms | 12.8 | 17.0 | 4.2 | 32.8 |
| 110 ohms | 14.5 | 19.0 | 4.5 | 31.1 |

Figure 2:
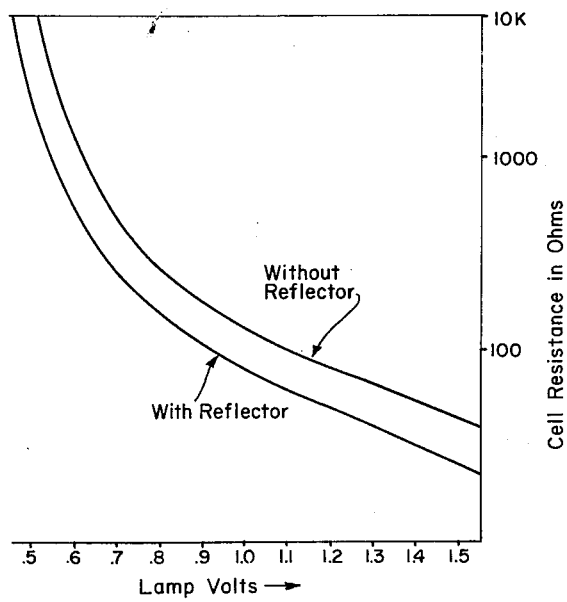
FIGURE 2 is a graph which plots the resistivity of my novel device as a function of the input voltage applied to the light source.

With this novel electro-optical device it is possible to couple directly into transistorized circuits. As may be seen by reference to the graph in FIG. 2, the lamp voltage necessary to produce a 200 ohm resistance across the photoconductive cell is .875 v. whereas to produce a 110 ohm resistance in the cell only about 1.1 volts are required. Consequently, my invention has great utility in circuit applications which were until now regarded as impractical for prior art devices of the general type described.

Figure 3:
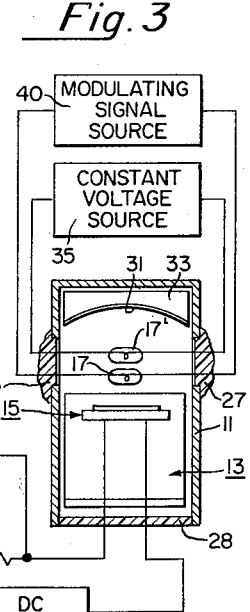
FIGURE 3 is a schematic circuit showing another form which my invention may take.

FIGURE 3 shows schematically how my invention may be used when more than one light source is provided. The construction may be essentially the same as shown in FIGURE 1 except for the fact that two pairs of insulated sleeves for the corresponding two sets of lamp leads are provided. A constant voltage source 35 such as a sine wave generator is connected across one of the prime lamps 17′, and a modulating light signal source 40 is connected across the other lamp 17. A D.C. source 45 is connected in series with the leads of the cell and a load resistor $R_L$. Thus, as the modulating light signal approaches its maximum amplitude, the resistance of the cell decreases so that the voltage drop across the load resistor $R_L$ increases toward its maximum. Conversely, a decrease in the modulating lamp voltage results in a decrease in the output voltage across $R_L$. As a result, the circuit of FIG. 3 is both a D.C. signal modulator and a "chopper" circuit.

Using the invention in a circuit such as the one in FIG. 3 has several advantages over modulation of the voltage applied to the cell for the same purpose. If the latter system is employed, it would be necessary to apply a large amplitude A.-C. voltage to the cell which would probably require transistors capable of making large voltage swings and the other circuit components like capacitors, resistors, etc., similarly constructed. This would require relatively expensive transistors and other circuit components. By using the circuit shown in FIG. 3 however, in which a high D.-C. is applied to the photocell and relatively low power is required to modulate the lamps, a large variation in the A.-C. signal output is attained without the special components required when the voltage across the cell is varied.

Of course, more than two lamps can be used as they are so small. They may be hooked up independently or have a common terminal, or be arranged in numerous other ways depending on the circuit requirements.

Other uses and advantages of my invention will occur to those skilled in the art and therefore the scope of my invention should be limited only by the claims therein.

I claim:

1. A circuit comprising: an electro-optical device which includes a photosensitive means responsive to radiation within a predetermined range of wavelengths, said device also including a plurality of means for producing radiation within said range of wavelengths, said device further including means surrounding said photosensitive means and said radiation-producing means, and constructed to prevent the transmission through it of radiation within said range and further being constructed to permit the application of voltages to said photo-sensitive means and to said radiation-producing means; circuit means connected to said photosensitive means for applying a voltage thereto; means for applying a constant voltage to one of said plurality of radiation-producing means; and means for applying a modulating voltage to another of said plurality of radiation-producing means thereby to produce across said load resistor a modulated output voltage.

2. The circuit according to claim 1 wherein said constant voltage has a uniform amplitude A.-C. waveform.

3. A circuit comprising: an electro-optical device which includes a photoconductive means responsive to radiation within a predetermined range of wavelengths, said device also including a plurality of means for producing radiation within said range of wavelengths, said device further including means surrounding said photosensitive means and said radiation-producing means and constructed to prevent the transmission through it of radiation within said range, said surrounding means including a pair of apertures generally opposite one another, opaque and non-conductive sealing means in said apertures through which conductors are passed to permit the application of voltages to said photosensitive means and to said radiation-producing means; means for applying a bi-directional voltage to one of said plurality of radiation-producing means, said bi-directional voltage having a substantially uniform waveform; means for applying a modulating voltage to another of said plurality of radiation-producing means; a source of a D.-C. voltage coupled to said photoconductive means; and a load impedance in series with said D.-C. source and with said photoconductive means across which an output voltage signal having an amplitude-modulated envelope may be obtained.

4. The circuit according to claim 3 wherein the waveform of said bi-directional voltage is sinusoidal.

5. A circuit comprising: an electro-optical device having a photoconductive cell having an area whose resistance is lowered as a function of visible light incident thereupon, said device also including at least two sources of visible light, said device also including generally tubular means surrounding said cell and said visible light sources, said surrounding means being constructed to be opaque to visible light and also having a pair of apertures therein which are aligned on an axis substantially transverse to the axis of said tubular means, opaque and non-conductive sealing means in said apertures through which conductors are passed to permit the application of voltages to said photoconductive cell and to said light sources; means for applying a bi-directional voltage signal of substantially constant waveform to one of said light sources; means for applying an amplitude modulated voltage signal of lower frequency than said bi-directional signal to the other of said two sources of visible light; and a D.-C. source and a load impedance external to and in series with said cell, said impedance developing an amplitude modulated envelope signal in response to the signals applied to said light sources.

6. The circuit according to claim 5 wherein said cell also includes a light-reflective means between one end of said tubular means and said photoconductive area.

References Cited by the Examiner

UNITED STATES PATENTS

| | | | |
|---|---|---|---|
| Re. 19,199 | 6/34 | Knowles | 250—217 |
| 1,634,420 | 7/27 | Grondahl | 250—217 |
| 2,408,589 | 10/46 | Wells | 250—217 |
| 2,413,486 | 12/46 | Denyssen | 250—220 |
| 2,892,092 | 6/59 | Behr | 250—206 |
| 2,904,695 | 9/59 | White | 250—206 |
| 2,964,619 | 12/60 | Hahn et al. | 250—199 |
| 2,967,945 | 1/61 | De Gier | 250—217 |
| 2,997,630 | 8/61 | Kruse. | |
| 3,102,227 | 8/63 | De Gier | 250—209 X |

RALPH G. NILSON, *Primary Examiner.*

MAX L. LEVY, WALTER STOLWEIN, *Examiners.*